United States Patent
Trainin et al.

(10) Patent No.: US 8,619,581 B2
(45) Date of Patent: Dec. 31, 2013

(54) METHOD, APPARATUS AND SYSTEM FOR SELECTING WIRELESS NETWORK CONTROLLER

(75) Inventors: Solomon B. Trainin, Haifa (IL); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 292 days.

(21) Appl. No.: 13/004,357

(22) Filed: Jan. 11, 2011

(65) Prior Publication Data

US 2012/0177016 A1  Jul. 12, 2012

(51) Int. Cl.
| | |
|---|---|
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| G01R 31/08 | (2006.01) |

(52) U.S. Cl.
USPC ........... 370/236; 370/252; 370/255; 370/509; 370/522

(58) Field of Classification Search
USPC .......................... 370/236, 252, 255, 509, 522
See application file for complete search history.

(56) References Cited

U.S. PATENT DOCUMENTS

| | | | |
|---|---|---|---|
| 6,954,436 B1 * | 10/2005 | Yip et al. ....................... | 370/254 |
| 7,092,720 B2 | 8/2006 | Stern-Berkowitz et al. | |
| 7,532,591 B2 | 5/2009 | Moon et al. | |
| 2008/0080425 A1 * | 4/2008 | Lee et al. ....................... | 370/331 |
| 2010/0008328 A1 * | 1/2010 | Maheshwari et al. ........ | 370/331 |
| 2010/0246385 A1 * | 9/2010 | Balasumbramanian et al. ............................. | 370/222 |
| 2010/0333209 A1 * | 12/2010 | Alve ............................... | 726/26 |
| 2011/0207460 A1 * | 8/2011 | Kim et al. ..................... | 455/436 |
| 2011/0274084 A1 * | 11/2011 | Chu et al. ..................... | 370/331 |
| 2011/0276665 A1 * | 11/2011 | Kim et al. ..................... | 709/220 |
| 2012/0177016 A1 * | 7/2012 | Trainin et al. ................. | 370/338 |

FOREIGN PATENT DOCUMENTS

| | | |
|---|---|---|
| EP | 1548985 A1 | 6/2005 |
| JP | 2002-111689 A | 4/2002 |
| JP | 2004-129042 A | 4/2004 |
| JP | 2005-027280 A | 1/2005 |
| JP | 2007036361 A | 2/2007 |
| JP | 2010-522519 A | 7/2010 |
| WO | 2008/116196 A1 | 9/2008 |

OTHER PUBLICATIONS

International Search Report and Written Opinion Received for PCT Patent Application No. PCT/US2012/020735, Mailed on Jul. 11, 2012, 10 pages.

(Continued)

*Primary Examiner* — Benjamin H Elliott, IV
(74) *Attorney, Agent, or Firm* — Shichrur & Co.

(57) ABSTRACT

Devices, systems and methods of selecting a station of a wireless network to perform the role of the wireless network controller or control point. The station may receive a request to check the capabilities of the station in order to select the wireless network controller wherein the request includes sending station capabilities values. The station checks the station capabilities by comparing the station self capabilities values with the sending station capabilities values in descending capabilities priority order and if the station capability value is higher than the sending station capability value then the station may selects the station with the highest capability value as the wireless network controller.

28 Claims, 3 Drawing Sheets

(56) References Cited

OTHER PUBLICATIONS

WirelessHD Specification Version 1.1 Overview; May 2010.
Wireless Gigabit Alliance WiGig Mac and PHY specification Version1.0; Apr. 2010.
Standard ECMA-387, 2nd Edition; Dec. 2010; High Rate 60 GHz PHY, MAC and PALs.
IEEE Standard for Information Technology—Telecommunications and Information exchange between systems—Local and metropolitan area networks—Specific requirements; Part 15.3: Wireless Medium Access Control (MAC) and Physical Layer (PHY) Specifications for High Rate Wireless Personal Area Networks (WPANs); Amendment 2: Millimeter-wave-based Alternative Physical Layer Extension; IEEE Std 802.15.3c™—2009 (Amendment to IEEE Std 802.15.3™—2003).
IEEE Standard for Information technology—Telecommunications and information exchange between systems—Local and metropolitan area networks—Specific requirements Part 11: Wireless LAN Medium Access Control (MAC) and Physical Layer (PHY) Specifications; IEEE Std 802.11™—2007 (Revision of IEEE Std 802.11-1999 ).
Office Action received for Japanese Patent Application No. 2012-001249 , mailed on Mar. 26, 2013, 4 pages of Office Action including 2 pages of English Translation.
Office Action for Japanese Patent Application No. 2012-001249, mailed on Jul. 9, 2013, 2 pages, including 1 page of English Translation.
International Preliminary Report on Patentability and Written Opinion for PCT Patent Application No. PCT/US2012/020735, Issued on Jul. 16, 2013, 6 pages.
Office Action for Japanese Patent Application No. 2012-001249, mailed on Oct. 15, 2013, 4 pages, including 2 pages of English translation.

* cited by examiner

FIG. 1

| | Reserved (Set to Zero) | MAX Associated STA Number | Total Number of Sectors | Pseudo-static allocations | TDDTT | PCP/AP Clustering | Power Source |
|---|---|---|---|---|---|---|---|
| Bits: | B0-B11 | B12-B19 | B20-B27 | B28 | B29 | B30 | B31 |

METHOD, APPARATUS AND SYSTEM FOR SELECTING WIRELESS NETWORK CONTROLLER

BACKGROUND OF THE INVENTION

A personal wireless area network (WPAN) is a network used for communication among computing devices (for example, personal devices such as telephones and personal digital assistants) close to one person. The reach of a WPAN may be a few meters. WPANs may be used for interpersonal communication among personal devices themselves, or for connecting via an uplink to a higher level network, for example the Internet.

The millimeter-wave WPAN and/or mmWave network may allow very high data rates (e.g., over 2 Gigabit per second (Gbps)) applications such as high speed Internet access, streaming content download (e.g., video on demand, high-definition television (HDTV), home theater, etc.), real time streaming and wireless data bus for cable replacement.

Some mmWave WPAN may include a personal basic service set (PBSS). The PBSS may include a plurality of stations (STA). The STAs may be multi-band capable STAs and/or 60 GHz STAs. The mmWave WPAN may also allow one of the STAs to be capable of operating as or perform as a PBSS control point (PCP). The PCP may control and/or to establish a direct link between two stations, if desired. Furthermore the PCP may assign and/or to schedule a service period (SP).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, or transmission devices. The terms "a" or "an", as used herein, are defined as one, or more than one. The term plurality, as used herein, is defined as two, or more than two. The term another, as used herein, is defined as, at least a second or more. The terms including and/or having, as used herein, are defined as, but not limited to, comprising. The term coupled as used herein, is defined as operably connected in any desired form for example, mechanically, electronically, digitally, directly, by software, by hardware and the like.

The term PBSS control point (PCP) as used herein, is defined as a station (STA) that operates as a control point of the mmWave network.

The term access point (AP) as used herein, is defined as any entity that has STA functionality and provides access to the distribution services, via the wireless medium (WM) for associated STAs.

The term wireless network controller as used herein, is defined as a station that's operates as PCP and/or as AP of the wireless network.

The term directional band (DBand) as used herein is defined as any frequency band wherein the Channel starting frequency is above 45 GHz.

The term DBand STA as used herein is defined as a STA whose radio transmitter is operating on a channel that is within the DBand.

The term personal basic service set (PBSS) as used herein is defined as a basic service set (BSS) which forms an ad hoc self-contained network, operates in the DBand, includes one PBSS control point (PCP), and in which access to a distribution system (DS) is not present but an intra-PBSS forwarding service is optionally present.

The term scheduled service period (SP) as used herein is scheduled by a quality of service (QoS) AP or a PCP. Scheduled SPs may start at fixed intervals of time, if desired.

The terms "traffic" and/or "traffic stream(s)" as used herein, are defined as a data flow and/or stream between wireless devices such as STAs. The term "session" as used herein is defined as state information kept or stored in a pair of stations that have an established a direct physical link (e.g., excludes forwarding); the state information may describe or define the session.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral device that is integrated with a computer, or a peripheral device that is attached to a computer. In some embodiments, the term "wireless device" may optionally include a wireless service.

Embodiments of the invention may provide devices, systems and methods to schedule a service period in mmWave network. For example, a PCP of the mmWave network is able to set a start time of a service period wherein, the start time is a no less than a predefined time after transmitting the PCP an information element containing the service period scheduling information, although the scope of the present invention is not limited to these examples.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, WLAN stations, wireless personal network (WPAN), and the like.

Types of WPAN stations intended to be within the scope of the present invention include, although are not limited to, stations capable of operating as a multi-band stations, stations capable of operating as PCP, stations capable of operating as an AP, stations capable of operating as DBand stations, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless AP, a wired or wireless router, a wired or wireless modem, a wired or wireless network, a wireless area network, a Wireless Video Are Network (WVAN), a Local Area Network (LAN), a WLAN, a PAN, a WPAN, devices and/or networks operating in accordance with existing WirelessHD™ and/or Wireless-Gigabit-Alliance (WGA) specifications and/or future versions and/or derivatives thereof, devices and/or networks operating in accordance with existing IEEE 802.11 (IEEE 802.11-19992007: *Wireless LAN Medium Access Control (MAC) and Physical Layer (PHY) Specifications*) standards and amendments ("the IEEE 802.11 standards"), IEEE 802.16 standards, and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

Some embodiments may be used in conjunction with suitable limited-range or short-range wireless communication networks, for example, "piconets", e.g., a wireless area network, a WVAN, a WPAN, and the like.

Figure 1:
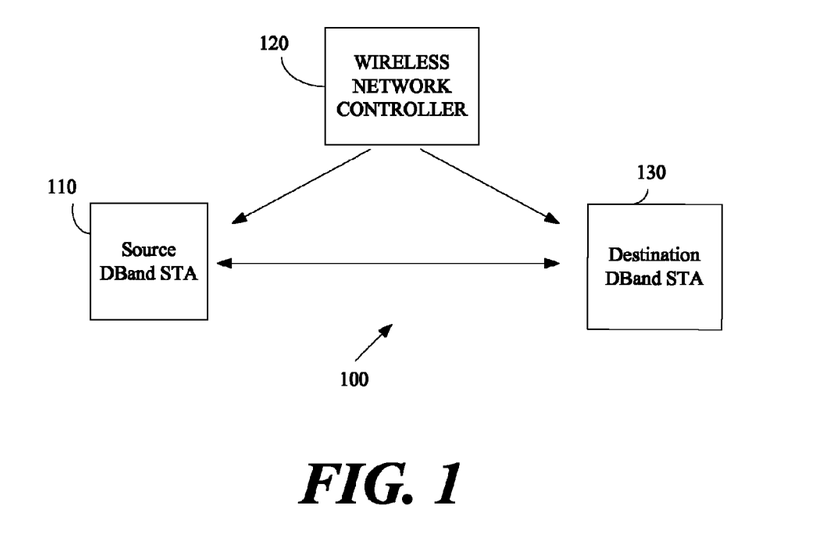
FIG. 1 is a schematic illustration of a wireless communication network according to exemplary embodiments of the present invention.

FIG. 1 is a schematic illustration of a wireless communication network 100 according to exemplary embodiments of the present invention. For example, wireless communication network 100 may operate according to the standard developed by the IEEE 802 802.11 Task Group ad (TGad) and/or according to WGA specification and/or according to IEEE 802.15.3c standard and/or according to WirelessHD™ specification and/or ECMA-387 standard or the like.

Although the scope of the present invention is not so limited, wireless communication network 100 may include a station 110, a wireless network controller 120 and a station 130. According to this example embodiment, each of stations 110 and 130 may capable of operating as a network controller. Network controller 120 may be capable of performing the role of a station, if desired.

Furthermore, station 110 and station 130 be capable of operating as source and destination DBand station, respectively, although the scope of the present invention is not limited in this respect.

In operation, wireless network controller 120 may be capable of performing the role of a PCP and/or an AP, if desired. Stations 110 and 120 may receive a request to check or evaluate their capabilities to become the wireless network controller. The request may include sending station capabilities values, or a set of these values. Each station may build and store from the station's capabilities a self wireless network controller factor for example, a PCP factor for a DBand station information element. Upon receiving peer station capabilities the station may build a wireless network controller factor of the sending stations. The PCP factor for a DBand station information element shall be described in detail with respect to FIG. 2.

According to this exemplary embodiment of the invention, each the stations 110 and 130 and wireless network controller 120 may check or evaluate the station self capabilities by comparing stored capabilities values e.g., self wireless network controller factor, with received capabilities values e.g., peer self wireless network controller factors, in descending capabilities priority order and if the station self capability value e.g., station 110, is higher than a peer station capability value e.g., station 130, then the station with the highest capability value or set of values or combined value may be selected as the wireless network controller or control point, although the scope of the present invention is not limited to this example. The factor or values compared may include a set of values, e.g., a set of bits, and thus the comparison may including comparing sets of values which may be combined to form a factor or overall value.

In order to perform the comparison, the station may combine the station self capabilities values and received peer stations capabilities value to provide, calculate or produce a station numerical combined capabilities value and a peer station numerical combined capabilities value, respectively, wherein a position of a capability in the combined capabilities value (and thus the position of the comparison of that value in an ordered comparison) depends on the priority of the capability and the capability having a higher weight in the combined capability value than a lower priority capability value.

For example a combined capability value may be for example a number which is a combined value of a the status of or value corresponding to permanent power source (e.g., whether it exists or not), the status of or value corresponding to a control point clustering capability, the status of or value corresponding to a capability to schedule Service Periods for associated stations, the status of or value corresponding to a capability to provide pseudo static scheduling, a total number of sectors of the station's antennas and a maximal number of stations to be associated with the wireless network control point to provide the numerical combined capabilities value.

Furthermore, the station may prioritize the station self capabilities in following order: a first and highest priority may be the status or existence of permanent power source, a second priority may be control point clustering capability, a third priority may be capability to schedule Service Periods for associated stations, a fourth priority may be the capability to provide pseudo static scheduling, a fifth priority may be a total number of sectors of the station's antenna's and the sixth priority may be the maximal number of stations to be associated with the wireless network control point, although the scope of the present invention is not limited in this respect.

In the case that the station self capability values or combined value are equal to the peer station's capability value or combined values, the station e.g., station 110, may compare the station MAC address value with that of peer stations e.g., station 130 and wireless network controller 120, and may select the station with the highest MAC value. The selected station for example station 130 may operate or perform according to a wireless network controller function to cause station 130 to perform the role of the wireless network controller, if desired.

Figure 2:
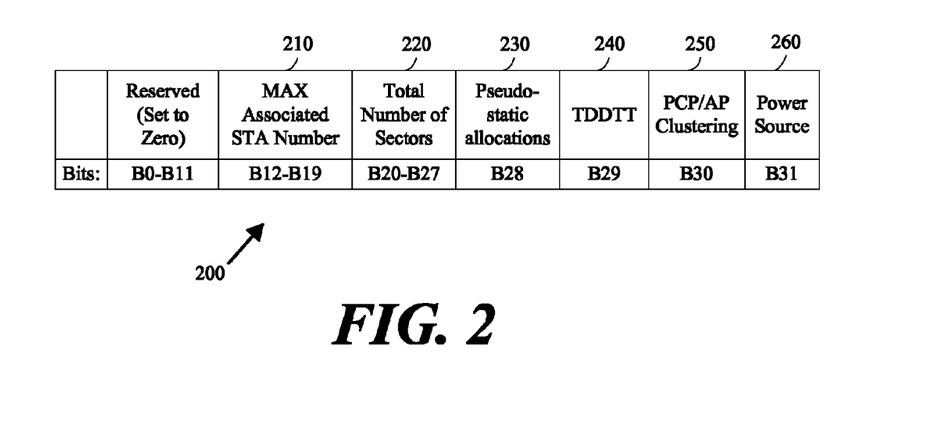
FIG. 2 is a schematic illustration of a wireless network controller capabilities factor for DBand station information element according to one exemplary embodiment of the invention.

FIG. 2 depicts wireless network controller capabilities factors for a DBand station information element according to one exemplary embodiment of the invention. According to some exemplary embodiments the wireless network controller capabilities factor may be referred to as a PCP capabilities factor 200, if desired According to this exemplary embodiment, station capabilities may include a maximum associated station number 210, a total number of sectors 220, pseudo-static allocations 230, a time division data transfer time (TDDTT) 240, a PCP/AP clustering 250 and a power source 260, although it should be understood that the scope of the present invention is not limited to these capabilities and other station capabilities may be used with embodiments of the invention.

According to embodiments of the invention, power source 260 value may be set to one if the STA is battery powered, and may be set to zero otherwise (e.g., if a permanent power source is used). Thus, according to this example the highest priority may gain when the power source value is zero and a highest value may be set to the combination of the station capabilities value, if desired.

The second priority is PCP/AP Clustering 250. PCP/AP Clustering 250 may be set to one if the STA, when operating as a PCP/AP, is capable of performing a PCP/AP clustering 250 and is set to zero otherwise. Thus, the priority of PCP/AP 250 may be gained or increased when the PCP/AP clustering value may be set to one, if desired.

TDDTT 240 may be the third priority. TDDTT 240 may be set to one if the STA, while operating as a PCP/AP, is capable of providing time division channel access as and may be set to zero otherwise. Thus, the priority of TDDTT 240 may be gained or increased when the TDDTT value is set to one Pseudo-static allocations 230 may be the fourth priority. Pseudo-static allocations 230 may be set to one if the STA, while operating as a PCP/AP, is capable of providing pseudo-static allocations and may be set to zero otherwise. Thus, the priority of Pseudo-static allocations 230 may be gained or increased when the Pseudo-static allocations is one, if desired.

Total Number of Sectors 220 may be the fifth priority. Total Number of Sectors 220 may indicate the total number of sectors the STA may use in a sector sweep combined over all antennas. According to this example the number of sectors may weight the fifth priority, if desired.

MAX Associated STA Number 210 is the sixth priority. According to this exemplary embodiment MAX Associated STA Number 210 may indicate the maximum number of STAs that the STA may perform association with if operating as a PCP/AP. According to this example the number of STAs may weight the sixth priority, if desired.

According to some exemplary embodiments of the invention, a PCP factor value may be a numerical combined value of the above described station capabilities. The decision whether the station may perform in the role of the wireless network controller may be done by comparing the value of the STA's PCP factor e.g., PCP factor 200 (self_PCP_factor) and the PCP factor of the peer STA (peer_PCP_factor) that is indicated in the peer station's DBand Capabilities element, if desired. Other factors may be used.

According to another exemplary embodiment, the PCP factor value of the station may be calculated, produced or constructed by concatenating the value of fields or select fields present in the station DBand Capabilities element, if desired. It should be noted that according to the convention, the least significant bit is the leftmost bit (B0), although the scope of the present invention is not limited in this respect.

In addition, If the DBand STA's value of self_PCP_factor is greater than the value of peer_PCP_factor or the values are equal and the MAC address of the STA is greater than the MAC address of the peer STA contained in the peer STA's DBand Capabilities element, the DBand STA may be set to or perform the role of the wireless network controller e.g., PCP or AP, otherwise, the STA may not perform the role of wireless network controller.

Furthermore, if the wireless network controller selection is performed as a result of the reception of a request the station may respond as follows. If the station becomes the wireless network controller it may respond with a success message. If the station may perform the role of non-PCP STA it may respond with an already started or join message.

In an explicit wireless network controller (e.g., PCP) handover, the wireless network controller may use the value of the PCP Factor when selecting the candidate wireless network controller, although the scope of the present invention is not limited in this respect.

Other values or coding, other than one and zero, or different meanings for one and zero, may be used.

Figure 3:
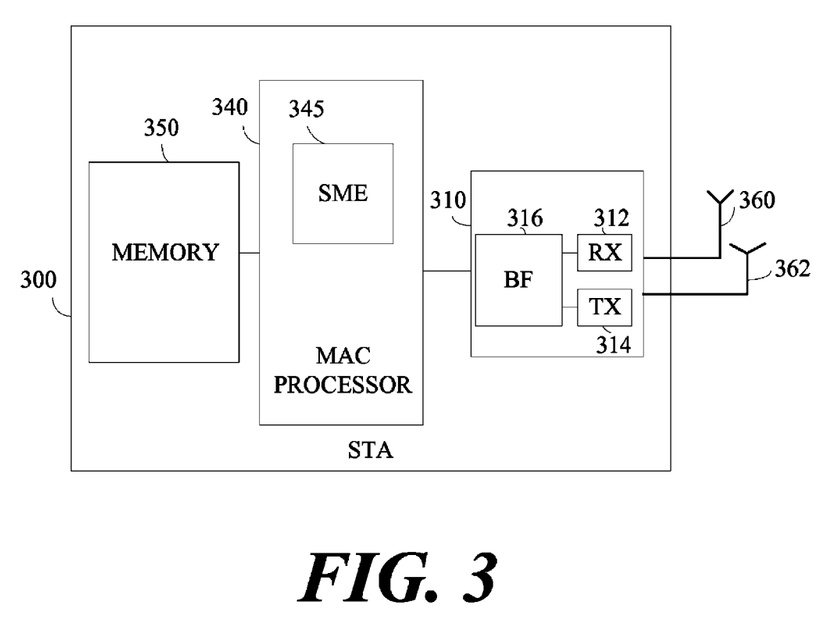
FIG. 3 is a schematic illustration of a station of a wireless communication network according to exemplary embodiments of the present invention.

Turning first to FIG. 3 a schematic illustration of a STA of a wireless communication network according to exemplary embodiments of the present invention is shown. According to embodiments of the present invention a station 300 may be a wireless communication device that is capable of operating, for example, as: a wireless network controller, an access point, a piconet controller (PNC), a station, a multiband station, a DBand station, an initiator, a responder or the like.

According to some exemplary embodiments of the invention station 300 may include for example, a radio 310. Radio 310 may be operably coupled to two or more antennas. For example radio 310 may operably coupled to antennas 360 and 362. Radio 310 may include at least a receiver (RX) 312, a transmitter (TX) 314 and a beamforming (BF) controller 316, although the scope of the present invention is not limited in this respect. Radio 310 may be or include a transceiver.

Furthermore, according to some embodiments of the invention, radio 310 may operate on the DBand for example, 60 GHz frequency band. Station 300 may further include a MAC processor 340 and a memory 350. MAC processor 340 may include a station management entity (SME) module 345. MAC processor 340 may operate a MAC protocol according to IEEE 802.11TAGad and/or IEEE 802.15.3c and or WirelessHD™ and/or ECMA-387 and/or ISO/IEC 13156: 2009 and/or Bluetooth™ and/or WGA specification, if desired. Methods according to an embodiment of the present invention, including, for example, calculating or producing a PCP factor value or other value, may be performed all or in part by MAC processor 340.

Memory 350 may include one or more of volatile memory, non-volatile memory, removable or non-removable memory, erasable or non-erasable memory, writeable or re-writeable memory, and the like. For example, memory 350 may include one or more random-access memory (RAM), dynamic RAM (DRAM), Double-Data-Rate DRAM (DDR-DRAM), synchronous DRAM (SDRAM), static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like.

In some exemplary embodiments, antennas 360 and 362 may include, for example, phase array antennas, an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data, although the scope of the present invention is not limited to these examples.

In some exemplary embodiments of the invention, BF controller 316 may include a multiple-input-multiple-output (MIMO) controller and/or a beamformer processor, if desired.

According to embodiment of the invention radio 310 and receiver 312 via antenna 360 may receive a request to check or evaluate their capabilities to become the wireless network controller. The request may include a sending station capabilities values. For example, the capabilities value may be included in a PCP factor for a DBand station information element which has been described in with respect to FIG. 2.

According to this exemplary embodiment of the invention, MAC processor 340 may check or evaluate the station self capabilities by comparing stored capabilities values e.g., self capabilities, with received capabilities values e.g., peer stations capabilities. The check may be done, for example, in order, such as, in descending capabilities priority order. For example, MAC processor may check a highest priority capability first and then the other capabilities in a descending order, if desired. If the station self capability value of e.g., station 110, is higher than a peer station capability value e.g., for station 130, then the station with the highest capability value may be selected as the wireless network controller or control point, although the scope of the present invention is not limited to this example.

In one embodiment, "selecting" may be done by the station which becomes or is selected to (e.g., by selecting itself) the network controller. A station deciding that it is not to be the controller may in some embodiments not select another station to be the controller, but rather may allow another station to select itself.

In order to perform the comparison, MAC processor 340 may combine the station self capabilities values and received peer stations capabilities value to calculate, provide or produce a station numerical combined capabilities value and a peer station numerical combined capabilities value, respectively, wherein a position of a capability in the combined capabilities value depends on the priority of the capability and/or on having a higher weight in the combined capability value than a lower priority capability value.

For example a combined capability value may be a combined value of a permanent power source, a control point clustering capability, a capability to schedule Service Periods for associated stations, a capability to provide pseudo static scheduling, a total number of sectors of the station's antennas and a maximal number of stations to be associated with the wireless network control point to provide, calculate or produce the numerical combined capabilities value.

Furthermore, MAC processor 340 may prioritize the station self capabilities in following order wherein a first and highest priority is the permanent power source, a second priority is control point clustering capability, a third priority is capability to schedule Service Periods for associated stations, a fourth priority is the capability to provide pseudo static scheduling, a fifth priority is a total number of sectors of the station's antennas and the sixth priority is the maximal number of stations to be associated with the wireless network control point, although the scope of the present invention is not limited in this respect.

In the case that the station self capability is equal to peer stations capability values, MAC processor 340 may compare the station MAC address value with peer stations e.g., station 130 and wireless network controller 120, MAC address values and may select the station with the highest medium access control value. SME 345 may enable the selected station for example, station 130, to operate according to a wireless network controller function and to cause station 130 to perform the role of the wireless network controller, if desired.

Figure 4:
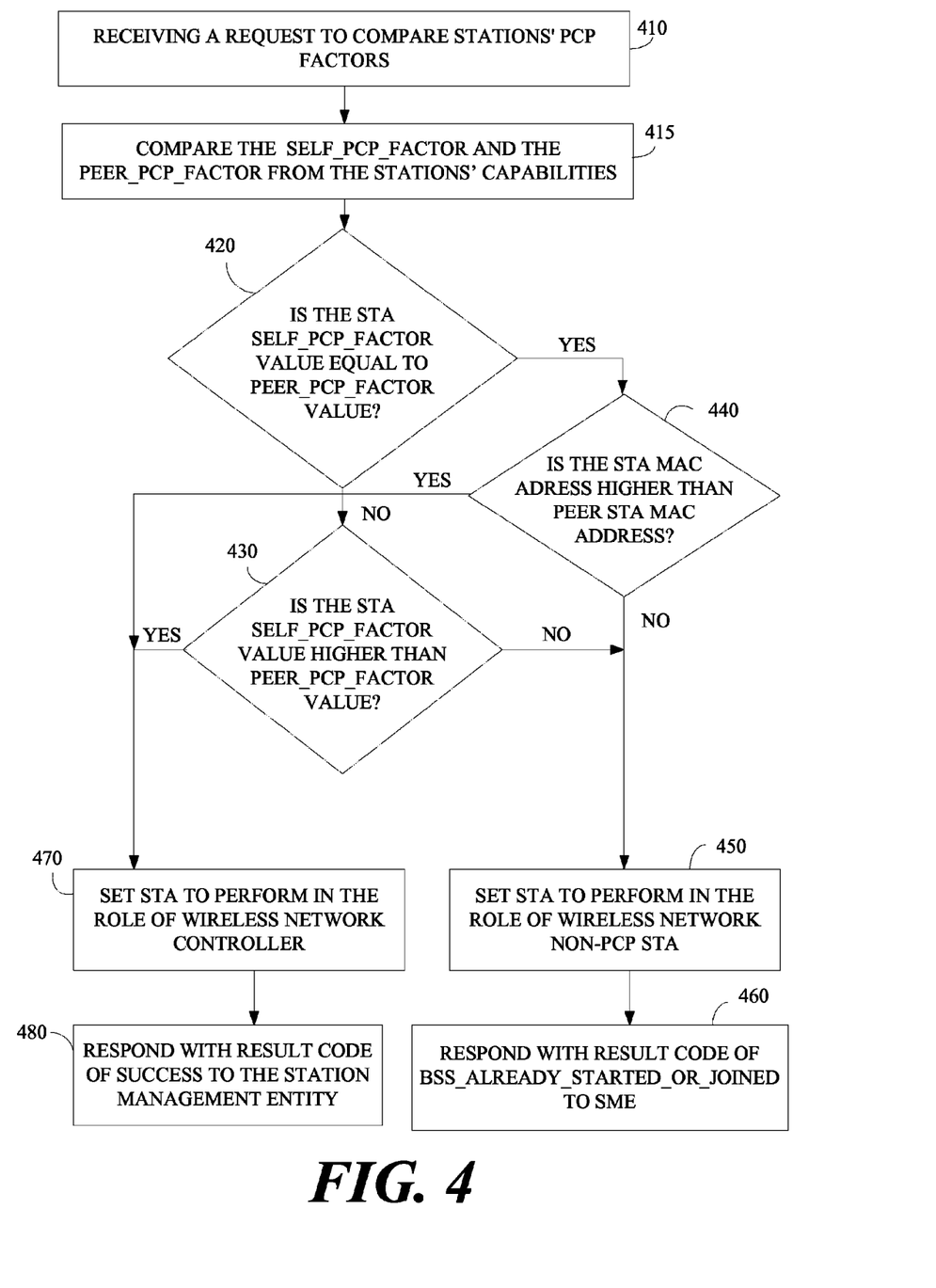
FIG. 4 is a flow chart of a method of selecting a wireless network controller, according to exemplary embodiments of the invention.

FIG. 4 is a flow chart of a method of selecting a wireless network controller, according to exemplary embodiments of the invention. For example the method may be executed by a MAC processor e.g., MAC processor 340 from or by executing instructions stored in memory 350, if desired.

The method may start by receiving a request message to check and compare stations' wireless network factors to perform a role of a wireless network controller for example, PCP and/or AP (text box 410). The request may include the sending station capabilities. The station may combine a self wireless network controller factor e.g., Self_PCP_factor and the peer station wireless network controller factor e.g., Peer_PCP_Factor for its self capabilities and received capabilities, respectively (text box 415). The station may check and/or compare for example, its Self_PCP_Factor value to the Peer_PCP_Factor value. If the station Self_PCP_Factor value is equal to the Self_PCP_Factor value (diamond 420) then the station may check or compare its MAC address against the peer station MAC address. If the station MAC address is higher than the peer station MAC address (diamond 440) then the station may be set to perform the role of the wireless network controller (text box 470) and may send a success message to the station management entity for example, SME 345, if desired (text box 480).

If the station self_PCP_Factor value in not equal to the Peer_PCP_Factor value (diamond 420) and the station self self_PCP_Factor value is higher than the self_PCP_Factor value (diamond 430) then the station may be set (e.g., by its station management entity) to perform the role of the wireless network controller (text box 470) by sending a success message or a message otherwise indicating this status to the stations' SME, e.g., SME 345, if desired (text box 480). If the station self_PCP_Factor value is equal to the Peer_PCP_Factor capability value (diamond 420) and if the station MAC address is lower than the peer station MAC address (diamond 440) then the peer station may be set to perform the role of wireless network controller (text box 450) and the station may send a message indicating this status, and/or "Already Started" or "Join" message to the stations' SME, e.g., SME 345, if desired (text box 460). Other or different operations may be performed.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A method of selecting a station of a wireless network to perform the role of a wireless network controller, the method comprising:
   receiving at the a first station a message from a second station, the message including a peer station capabilities element indicating capabilities values of the second station;
   comparing at the first station a self station factor with a peer station factor, the self station factor including a concatenation of capabilities values of the first station, and the peer station factor including a concatenation of the capabilities values of the second station in descending capabilities priority order; and
   at the first station, selecting the first station to become a candidate wireless network controller, when a value of the self station factor is greater than a value of the peer station factor.

2. The method of claim 1 comprising:
   determining the self station factor by combining the capabilities values of the first station to produce a numerical combined value, wherein a position of a capability in the combined value depends on a priority of the capability and on a weight of the capability.

3. The method of claim 1, comprising:
   determining the self station factor by combining values of a status of a permanent power source, a control point clustering capability, a capability to schedule Service Periods for associated stations, a capability to provide pseudo static scheduling, a total number of antenna sectors, and
   a maximal number of stations to be associated with.

4. The method of claim 3, wherein determining the self station factor comprises:
   prioritizing the capabilities values of the first station in the following order, wherein a first and highest priority is the status of permanent power source, a second priority is the control point clustering capability, a third priority is the capability to schedule Service Periods for associated stations, a fourth priority is the capability to provide pseudo static scheduling, a fifth priority is the total number of antenna sectors, and a sixth priority is the maximal number of stations to be associated.

5. The method of claim 1 comprising selecting the first station to become the candidate wireless network controller, when the value of the self station factor is equal to the value of the peer station factor and a medium access control address value of the first station is greater than a medium access control address value of the second station.

6. The method of claim 1, comprising:
   starting a control point function at the first station; and
   at the first station, performing a role of a control point of the wireless network.

7. A first station of a wireless network, the station comprising:
   a transceiver to receive a message from a second station, the message including a peer station capabilities element indicating capabilities values of the second station;
   a memory to store a self station factor, which includes a concatenation of capabilities values of the first station;
   a medium access control (MAC) processor to compare the self station factor to a peer station factor, the peer station factor including a concatenation of the capabilities values of the second station in descending capabilities priority order; said MAC processor is to select the first station to become a candidate wireless network controller, when a value of the self station factor is greater than a value of the peer station factor.

8. The first station of claim 7, wherein the MAC processor is able to determine the self station factor by combining the capabilities values of the first station to produce a numerical combined value, wherein a position of a capability in the combined value depends on a priority of the capability and a weight of the capability.

9. The first station of claim 7, wherein the MAC processor is able to determine the self station factor by combining values of a status of a permanent power source, a control point clustering capability, a capability to schedule Service Periods for associated stations, a capability to provide pseudo static scheduling, a total number of antenna sectors, and a maximal number of stations to be associated.

10. The first station of claim 9, wherein the MAC processor is able to prioritize the capabilities values of the first station in the following order, wherein a first and highest priority is the status of permanent power source, a second priority is the control point clustering capability, a third priority is the capability to schedule Service Periods for associated stations, a fourth priority is the capability to provide pseudo static scheduling, a fifth priority is the total number of antenna sectors, and a sixth priority is the maximal number of stations to be associated.

11. The first station of claim 7, wherein the MAC processor is able to select the first station to become the candidate wireless network controller, when the value of the self station factor is equal to the value of the peer station factor, and a MAC address value of the first station is greater than a MAC address value of the second station.

12. The first station of claim 7, wherein the MAC processor is able to operate a control point function and to cause the first station to perform a role of a control point of the wireless network.

13. The first station of claim 7, wherein the wireless network controller comprises a personal basic service set (PBSS) control point (PCP).

14. The first station of claim 7 comprising a direct band (DBand) station.

15. A wireless communication system comprising:
a first station of a wireless network, wherein the first station comprises:
at least one antenna;
a transceiver to receive a message from a second station, the message including a peer station capabilities element indicating capabilities values of the second station;
a memory to store a self station factor, which includes a concatenation of capabilities values of the first station;
a medium access control (MAC) processor to compare the self station factor to a peer station factor, the peer station factor including a concatenation of the capabilities values of the second station in descending capabilities priority order, said MAC processor is to select the first station to become a candidate wireless network controller, when a value of the self station factor is greater than a value of the peer station factor.

16. The wireless communication system of claim 15, wherein the MAC processor is able to determine the self station factor by combining the capabilities values of the first station to produce a numerical combined value, wherein a position of a capability in the combined value depends on a priority of the capability and a weight of the capability.

17. The station of claim 15, wherein the MAC processor is able to determine the self station factor by combining values of a status of a permanent power source, a control point clustering capability, a capability to schedule Service Periods for associated stations, a capability to provide pseudo static scheduling, a total number of antenna sectors, and a maximal number of stations to be associated.

18. The wireless communication system of claim 17, wherein the MAC processor is able to prioritize the capabilities values of the first station in the following order, wherein a first and highest priority is the status of permanent power source, a second priority is the control point clustering capability, a third priority is the capability to schedule Service Periods for associated stations, a fourth priority is the capability to provide pseudo static scheduling, a fifth priority is the total number of antenna sectors, and a sixth priority is the maximal number of stations to be associated.

19. The wireless communication system of claim 15, wherein the MAC processor is able to select the first station to become the candidate wireless network controller, when the value of the self station factor is equal to the value of the peer station factor, and a MAC address value of the first station is greater than a MAC address value of the second station.

20. The wireless communication system of claim 15, wherein the MAC processor is able to operate a control point function to cause the first station to perform a role of a control point of the wireless network.

21. The wireless communication system of claim 15, wherein the wireless station network controller comprises a personal basic service set (PBSS) control point (PCP).

22. The wireless communication system of claim 15, wherein the first station comprises a direct band (DBand) station.

23. A medium access control (MAC) processor comprising:
a non-transitory computer readable storage medium, having stored thereon instructions, that when executed, result in:
receiving at a first station a message from a second station, the message including a peer station capabilities element indicating capabilities values of the second station;
comparing at the first station a self station factor with a peer station factor, the self station factor including a concatenation of capabilities values of the first station, and the peer station factor including a concatenation of the capabilities values of the second station in descending capabilities priority order; and at the first station, selecting the first station to become a candidate wireless network controller, when a value of the self station factor is greater than a value of the peer station factor.

24. The MAC processor of claim 23, wherein the instructions when executed, result in:
determining the self station factor by combining the capabilities values of the first station to produce a numerical combined value, wherein a position of a capability in the combined value depends on a priority of the capability and on a weight of the capability.

25. The MAC processor of claim 23, wherein the instructions when executed, result in:
combining values of a status of a permanent power source, a control point clustering capability, a capability to schedule Service Periods for associated stations, a capability to provide pseudo static scheduling, a total number of antenna sectors, and a maximal number of stations to be associated.

26. The MAC processor of claim 25, wherein the instructions when executed result in:

prioritizing the capabilities values of the first station in the following order, wherein a first and highest priority is the status of permanent power source, a second priority is the control point clustering capability, a third priority is the capability to schedule Service Periods for associated stations, a fourth priority is the capability to provide pseudo static scheduling, a fifth priority is the total number of antenna sectors, and a sixth priority is the maximal number of stations to be associated.

27. The MAC processor of claim 23, wherein the instructions when executed, result in:
selecting the first station to become the candidate wireless network controller, when the value of the self station factor is equal to the value of the peer station factor and a medium access control address value of the first station is greater than a medium access control address value of the second station.

28. The MAC processor of claim 23, wherein the instructions when executed, result in:
starting a control point function at the first station; and at the first station, performing a role of a control point of the wireless network.

* * * * *

UNITED STATES PATENT AND TRADEMARK OFFICE
CERTIFICATE OF CORRECTION

Page 1 of 1

PATENT NO. : 8,619,581 B2
APPLICATION NO. : 13/004357
DATED : December 31, 2013
INVENTOR(S) : Solomon B. Trainin et al.

It is certified that error appears in the above-identified patent and that said Letters Patent is hereby corrected as shown below:

In the Claims

Column 10, line 10, in claim 1, delete "at the" and insert -- at --, therefor.

Column 10, line 37, in claim 3, delete "associated with." and insert -- associated. --, therefor.

Column 10, line 59, in claim 7, delete "the station" and insert -- the first station --, therefor.

Column 11, line 3, in claim 7, delete "order;" and insert -- order, --, therefor.

Column 12, line 1, in claim 17, delete "station" and insert -- wireless communication system --, therefor.

Column 12, line 29, in claim 21, delete "wireless station" and insert -- wireless --, therefor.

Signed and Sealed this
Twenty-second Day of April, 2014

Michelle K. Lee
*Deputy Director of the United States Patent and Trademark Office*